United States Patent
Chen et al.

(10) Patent No.: US 9,178,906 B1
(45) Date of Patent: *Nov. 3, 2015

(54) DETECTING AND REMEDIATING MALWARE DROPPED BY FILES

(71) Applicant: Symantec Corporation, Mountain View, CA (US)

(72) Inventors: Joseph H. Chen, Los Angeles, CA (US); Zhongning Chen, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,624

(22) Filed: Jul. 11, 2014

Related U.S. Application Data

(63) Continuation of application No. 12/914,949, filed on Oct. 28, 2010, now Pat. No. 8,832,835.

(51) Int. Cl.
| | | |
|---|---|---|
| *G06F 11/00* | (2006.01) | |
| *G06F 11/30* | (2006.01) | |
| *H04L 29/06* | (2006.01) | |
| *G06F 12/14* | (2006.01) | |
| *G06F 12/16* | (2006.01) | |

(52) U.S. Cl.
CPC .......... *H04L 63/1441* (2013.01); *H04L 63/145* (2013.01); *H04L 63/1408* (2013.01)

(58) Field of Classification Search
CPC ....... G06F 21/56; G06F 11/30; H04L 63/145; H04L 12/2602
See application file for complete search history.

(56) References Cited

U.S. PATENT DOCUMENTS

| | | | | |
|---|---|---|---|---|
| 6,519,703 | B1 * | 2/2003 | Joyce | 726/22 |
| 7,093,002 | B2 * | 8/2006 | Wolff et al. | 709/219 |
| 7,114,185 | B2 | 9/2006 | Moore et al. | |
| 7,290,282 | B1 * | 10/2007 | Renert et al. | 726/24 |
| 7,418,729 | B2 * | 8/2008 | Szor | 726/22 |
| 7,496,963 | B2 * | 2/2009 | Shipp | 726/24 |
| 7,523,502 | B1 * | 4/2009 | Kennedy et al. | 726/24 |
| 7,594,272 | B1 * | 9/2009 | Kennedy et al. | 726/24 |
| 7,681,235 | B2 * | 3/2010 | Chesla et al. | 726/23 |
| 7,757,292 | B1 | 7/2010 | Renert et al. | |
| 7,779,472 | B1 * | 8/2010 | Lou | 726/24 |
| 7,849,502 | B1 * | 12/2010 | Bloch et al. | 726/11 |
| 8,091,127 | B2 * | 1/2012 | Bradicich et al. | 726/22 |
| 8,099,784 | B1 * | 1/2012 | Chen et al. | 726/23 |
| 8,191,147 | B1 * | 5/2012 | Gardner et al. | 726/24 |
| 8,250,655 | B1 * | 8/2012 | Malanov et al. | 726/24 |
| 8,280,830 | B2 | 10/2012 | Kennedy | |
| 8,291,497 | B1 * | 10/2012 | Griffin et al. | 726/23 |
| 8,302,194 | B2 | 10/2012 | Conrad et al. | |
| 8,402,539 | B1 * | 3/2013 | Chen et al. | 726/22 |

(Continued)

*Primary Examiner* — Dede Zecher
*Assistant Examiner* — Trang Doan
(74) *Attorney, Agent, or Firm* — Fenwick & West LLP

(57) ABSTRACT

A security module detects and remediates malware from suspicious hosts. A file arrives at an endpoint from a host. The security module detects the arrival of the file and determines the host from which the file arrived. The security module also determines whether the host is suspicious. If the host is suspicious, the security module observes the operation of the file and identifies a set of files dropped by the received file. The security module monitors the files in the set using heuristics to detect whether any of the files engage in malicious behavior. If a file engages in malicious behavior, the security module responds to the malware detection by remediating the malware, which may include removing system changes caused by the set.

20 Claims, 4 Drawing Sheets

(56) References Cited

U.S. PATENT DOCUMENTS

| | | | |
|---|---|---|---|
| 8,402,541 B2* | 3/2013 | Craioveanu et al. | 726/23 |
| 8,443,449 B1* | 5/2013 | Fan et al. | 726/24 |
| 8,448,243 B1* | 5/2013 | Sankruthi | 726/22 |
| 8,499,350 B1* | 7/2013 | Satish | 726/24 |
| 8,533,831 B2* | 9/2013 | Satish | 726/23 |
| 8,561,180 B1* | 10/2013 | Nachenberg | 726/22 |
| 8,561,195 B1* | 10/2013 | Chen et al. | 726/24 |
| 8,635,171 B1* | 1/2014 | Kennedy | 706/12 |
| 2003/0120947 A1* | 6/2003 | Moore et al. | 713/200 |
| 2004/0243829 A1* | 12/2004 | Jordan | 713/200 |
| 2005/0080816 A1* | 4/2005 | Shipp | 707/104.1 |
| 2007/0056035 A1* | 3/2007 | Copley | 726/22 |
| 2009/0113548 A1* | 4/2009 | Gray et al. | 726/24 |
| 2010/0154056 A1* | 6/2010 | Smith et al. | 726/22 |
| 2011/0023115 A1* | 1/2011 | Wright | 726/22 |
| 2011/0055123 A1* | 3/2011 | Kennedy | 706/12 |
| 2011/0099634 A1* | 4/2011 | Conrad et al. | 726/24 |
| 2011/0154496 A1* | 6/2011 | Cheng | 726/24 |
| 2012/0005751 A1* | 1/2012 | Chen et al. | 726/23 |
| 2012/0304244 A1* | 11/2012 | Xie et al. | 726/1 |
| 2013/0067577 A1* | 3/2013 | Turbin et al. | 726/24 |

* cited by examiner

DETECTING AND REMEDIATING MALWARE DROPPED BY FILES

CROSS-REFERENCE TO RELATED APPLICATION

This application is a continuation of U.S. patent application Ser. No. 12/914,949, filed Oct. 28, 2010, which issued on Sep. 9, 2014 as U.S. Pat. No. 8,832,835 and is incorporated herein by reference.

BACKGROUND OF THE INVENTION

1. Field of the Invention

This invention pertains in general to computer security and in particular to detection of malicious software ("malware").

2. Description of the Related Art

Modern computer systems are often susceptible to a number of different problems, problems which are exacerbated by the increasing complexity of computer systems. One such problem relates to system security. There exists a wide variety of security threats posed by malicious software—collectively referred to as "malware"— that secretly performs operations not desired by the computer user. Such operations include theft of important data (e.g. financial records), modification or destruction of system or user files, execution of "backdoor" programs, and the like.

Unfortunately, malware proves difficult to detect. Conventional solutions may track and monitor the behavior of each and every file in a computer system to identify malicious activity. However, this brute force approach to detecting malware is inefficient and consumes a tremendous amount of system resources.

BRIEF SUMMARY OF THE INVENTION

The above and other needs are met by a method, a non-transitory computer-readable storage medium, and a system for detecting malicious software (malware) on an endpoint. Embodiments of the method comprise detecting arrival of a file at the endpoint from a host and determining whether the host is suspicious. Responsive to a determination that the host is suspicious, a set of files on the endpoint is identified. The set of files comprises the arrived file and any files dropped by the arrived file. The behavior of files in the set is monitored to determine whether any of the files in the set are malware.

Embodiments of the computer-readable storage medium store computer-executable instructions for performing the steps described above. Embodiments of the system further comprise a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
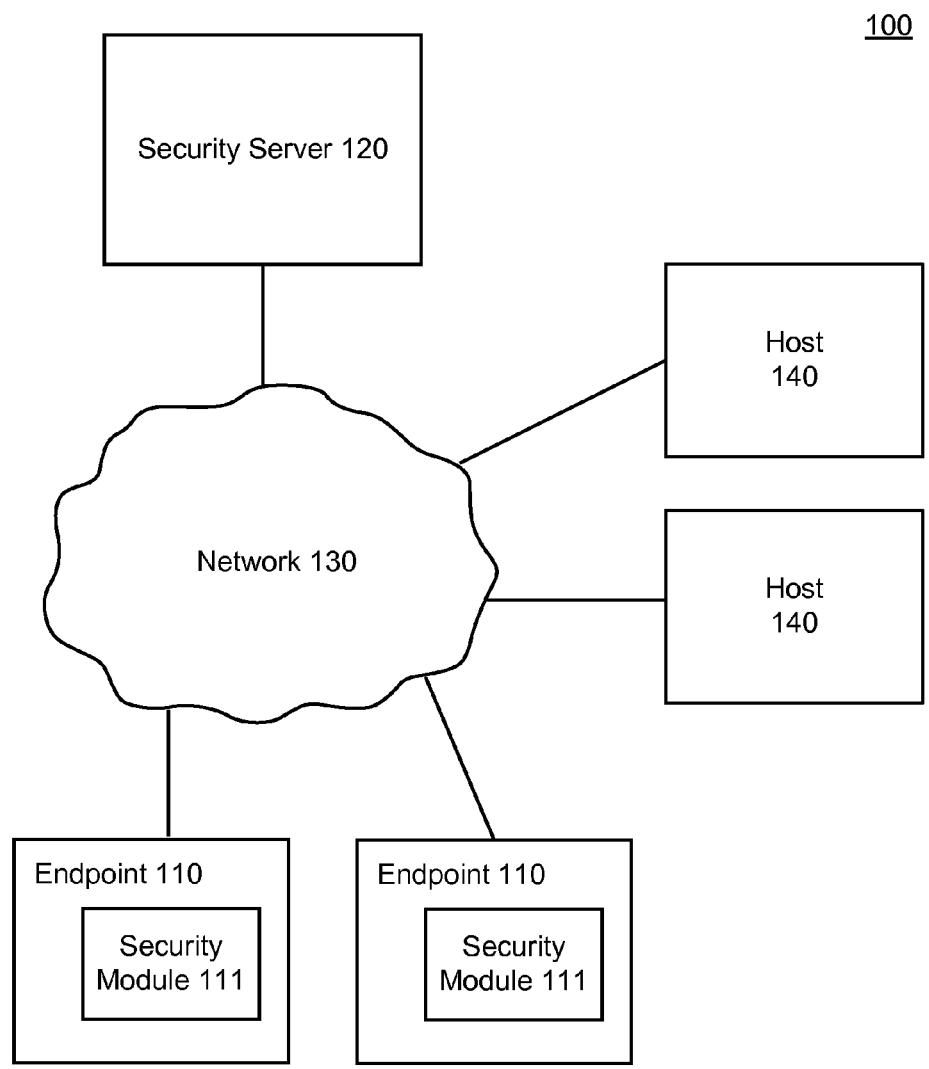
FIG. 1 is a high-level block diagram of a computing environment according to one embodiment.

FIG. 1 is a high-level block diagram of a computing environment 100 according to one embodiment. FIG. 1 illustrates several endpoints 110, several hosts 140, and a security server 120 connected by a network 130. Only two endpoints 110, two hosts 140, and one security server 120 are shown in FIG. 1 in order to simplify and clarify the description. Embodiments of the computing environment 100 can have thousands or millions of endpoints 110 and hosts 140 connected to the network 130. Embodiments can have multiple security servers 120 as well.

The host 140 is a computer system that stores files of any format (e.g., binary or textual) for transmission over the network 130. The files can be installation files ("installers") that are used for installing software on an endpoint 110. In one embodiment, the host 140 is a website provider that is associated with a uniform resource locator (URL) and has an internet protocol (IP) address. A host may be associated with a reputation that indicates whether the host is trustworthy. A host with a good reputation is recognized as a legitimate distributor of files. A host with a bad reputation is recognized as a potential distributor of malware files because, for example, the host has distributed malware in the past or is visited primarily by endpoints 110 on which malware is often detected.

An endpoint 110 is used by one or more users to perform activities including downloading files from the host 140, installing the files, and/or executing the files. The endpoint 110 can be, for example, a computer running an operating system such as MICROSOFT WINDOWS and executing a web browser that allows the user to download files from a host 140 via the network 130. In other embodiments, the endpoint 110 is a network-capable device other than a computer, such as a mobile phone, personal digital assistant (PDA), music player, or television "set-top box."

In one embodiment, the endpoint 110 receives an installer from a host 140. The installer is used to install one or more software applications on the endpoint 110. An installer contains data representing the software in either compressed or uncompressed form. Some installers are self-executing. For example, the installer can be a file with the extension ".EXE" which is a self-executing installer. Other installers are not self-executing. For example, the installer can also be a file with the extension ".MSI", which represents a non self-executing installer that is used by the MICROSOFT WINDOWS INSTALLER to install software.

When used to install software, the installer "drops" one or more other files onto the endpoint 110. In one embodiment, to "drop" means to create or extract files based on the data in the installer. For example, if the installer "firefox.msi" is used to install the FIREFOX internet browser, the files "firefox.exe" and "firefox.hlp" may be extracted from "firefox.msi". In another embodiment, the installer "drops" files by downloading additional files from a host 140, which may or may not be the same host 140 that the installer was received from. In another embodiment, "drop" can mean either creating or extracting files based on data in the installer and downloading additional files. Additionally, the installer may contain information that is used to make system changes during the installation process, such as modifications to the registry of the operating system on the endpoint 110.

All or some of the files dropped by the installer may represent malicious software (malware) that secretly performs undesirable actions, such as modifying system files, making system changes or copying personal financial data. In one embodiment, the malicious software is a misleading application. A misleading application appears legitimate but secretly performs undesirable actions. One type of misleading application misrepresents the security status of a computer or fakes the existence of problems on a computer in order to convince a user to purchase additional software. For example, in MICROSOFT WINDOWS based operating systems, a misleading application may generate a pop-up message in the system tray notifying the user of a security vulnerability and directing the user to a website where fake virus scanning software can be purchased.

An endpoint 110 also executes a security module 111 that detects malware at the endpoint 110. In one embodiment, the security module 111 determines whether a host 140 from which a file arrives is suspicious. If the file arrives from a suspicious host, the file itself is designated as suspicious. Suspicious files and files dropped by suspicious files are tracked as a set of suspicious files. The security module 111 monitors the behaviors of the files in the set for malicious activity. If the files in the set engage in malicious activity, either individually or collectively, the security module 111 responds with actions such as convicting the set as malicious and remediating the endpoint 110 by undoing any system changes made by the set.

The security module 111 thus selectively tracks the activity of certain files that are likely to represent malware, while giving lower scrutiny to other files. Files arriving from suspicious hosts 140 are designated for heightened scrutiny, which includes tracking suspicious files and files dropped by the suspicious files as a set, tracking system changes made by the set, and/or monitoring the behavior of the set for malicious behavior using a set of heuristics. These files can be closely tracked in a resource intensive manner because there are typically only a small number of suspicious files on an endpoint 110. On the other hand, files that arrive from non-suspicious hosts 140 are designated for lower scrutiny. Lower scrutiny can include exempting the file and files dropped by the file from being tracked and monitored, and/or applying a set of low resource intensive heuristics when monitoring the behavior of these files.

The security server 120 communicates with the endpoint 110 via the network 130 to provide security-related information. The security server 120 can provide information such as a list of suspicious hosts 140, reputations for hosts 140, behavioral heuristics for detecting malware, instructions for remediating malware, etc. The security server 120 can also receive notifications describing files detected by the security module 111 at the endpoint 110. In addition, the security server 120 can respond to queries from an endpoint 110 asking for information about whether a particular host 140 is suspicious.

The network 130 represents the communication pathways between the endpoints 110, hosts 140, and the security server 120. In one embodiment, the network 130 is the Internet and uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
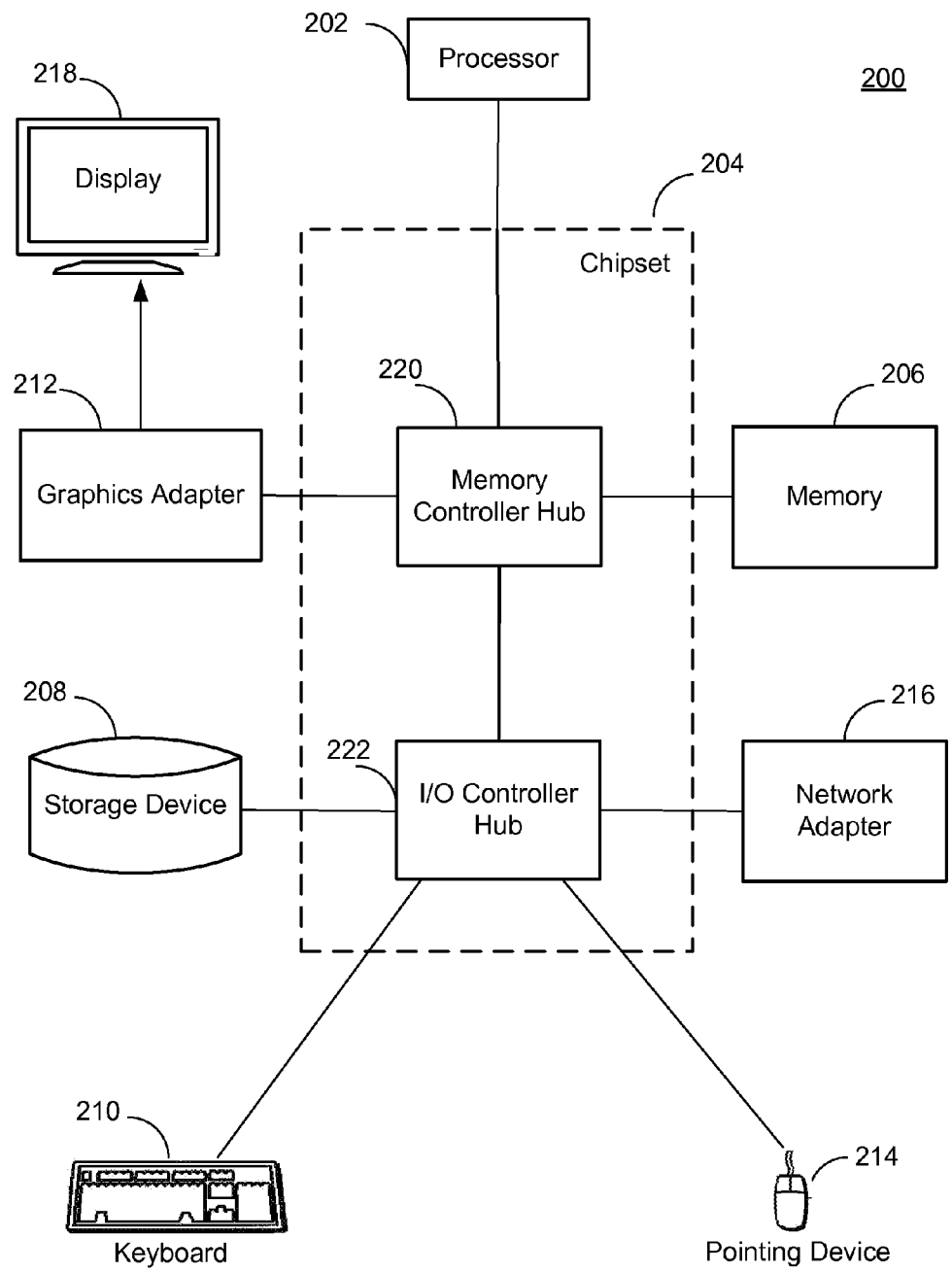
FIG. 2 is a high-level block diagram illustrating a functional view of a typical computer system for use as a security server, endpoint, or host according to one embodiment.

FIG. 2 is a high-level block diagram illustrating an example computer 200 for use as an endpoint 110, security server 120, or host 140 according to one embodiment. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The storage device 208 holds software, installers, and other data in the form of files. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security server 120 might comprise multiple blade servers working together to provide the functionality described herein. As another example, the endpoint 110 might comprise a mobile telephone with limited processing power. The computers 200 can lack some of the components described above, such as keyboards 210, graphics adapters 212, and displays 218.

Figure 3:
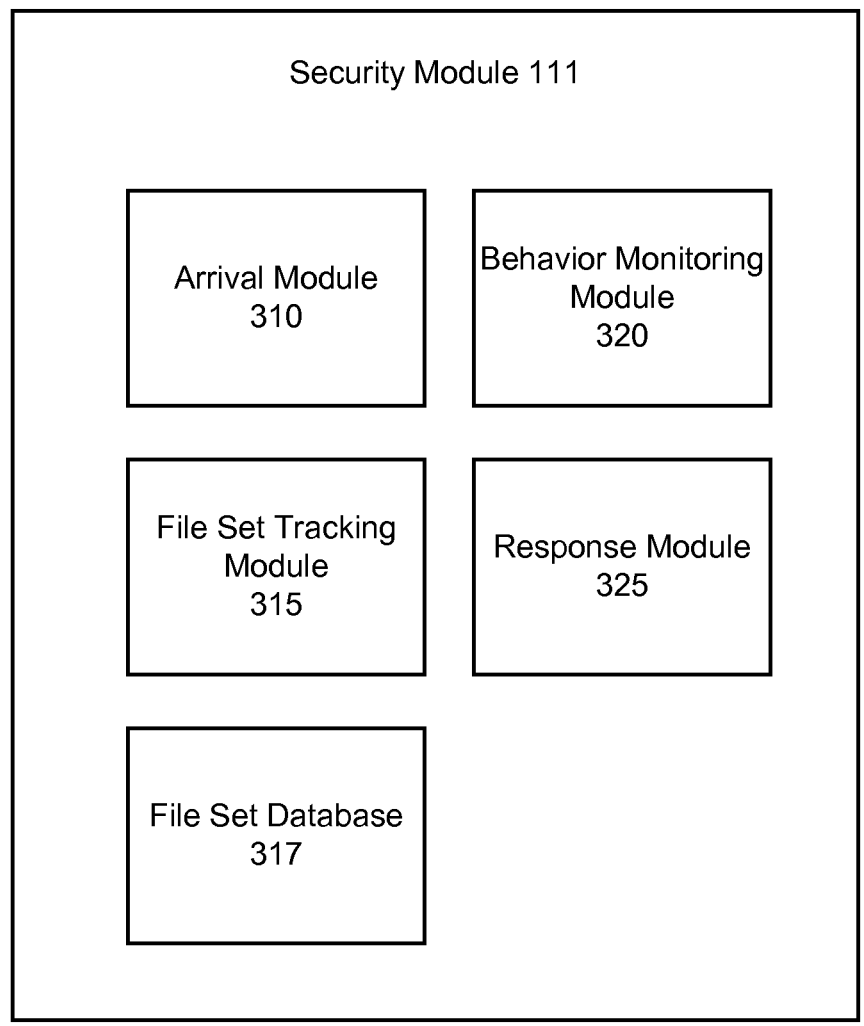
FIG. 3 is a high-level block diagram illustrating a detailed view of a security module of an endpoint according to one embodiment.

FIG. 3 is a high-level block diagram illustrating a detailed view of the security module 111 of an endpoint 110 according to one embodiment. In some embodiments the security module 111 is incorporated into the operating system executing on the endpoint 110 while in other embodiments the security module 111 is a standalone application or part of another product. As shown in FIG. 3, the security module 111 itself includes multiple modules.

An arrival module 310 monitors the endpoint 110 to identify the arrival of new files. Files typically arrive via the network 130 from a host 140 and are stored on a storage device of the endpoint 110. The arrival module 310 can detect the arrival of a new file via a variety of techniques, such as by detecting the creation of a new file on the storage device and/or by monitoring network traffic to detect a file being received by the endpoint 110. The arrival module 310 also identifies the host 140 that the file arrived from. The arrival module 310 can identify the host 140 via a variety of techniques, such as by monitoring network traffic to identify the URL or IP address associated with an arriving file.

In one embodiment, a file arrives in response to a user of the endpoint 110 requesting the file from the host 140. For example, the user may use a web browser to access a website provided by the host 140 and download a file from the website. In other embodiments, a file may arrive without any user input, and the transfer of the file may be initiated by either the endpoint 110 or the host 140.

The arrival module 310 designates files that arrive from suspicious hosts as "suspicious." Suspicious hosts are known to be or are likely to be sources of malware. In one embodiment, the arrival module 310 maintains a list of suspicious hosts. The list of suspicious hosts includes network identifiers for suspicious hosts, such as uniform resource locators (URL) and/or internet protocol (IP) addresses associated with the hosts 140. A URL may include, for example, a domain name (e.g. fakesite.com) or a sub-domain name (e.g. malware.fakesite.com) for the host 140. The arrival module 310 may obtain the list of suspicious hosts from the security server 120, and update the list on a periodic basis. The arrival module 310 compares the host 140 of the arriving file to the list, and if the host 140 appears in the list, the file is designated as suspicious.

In another embodiment, the arrival module 310 maintains a list of different hosts 140 and their reputation scores. Files arriving from hosts 140 with bad reputations are designated as suspicious. A host 140 has a bad reputation, for example, if the reputation score of the host 140 falls below a threshold value.

In yet another embodiment, the list of suspicious hosts or list of reputation scores is centrally maintained on the security server 120. Upon detecting the arrival of a new file, the arrival module 310 queries the security server 120 with a network identifier (e.g., URL, IP address) for the file host 140, and the security server 120 responds with an indication of whether the host 140 is suspicious. The arrival module 310 designates the arriving file as suspicious if the security server 120 indicates that the host 140 is suspicious.

Using the host 140 of a file as a triggering point for determining whether the file is suspicious enables heightened scrutiny of suspicious files. Files associated with suspicious hosts 140 are more likely to represent malware, and are thus tracked and monitored more closely. Other files are not as likely to be associated with malware and are not tracked and monitored as closely.

A file set tracking module 315 maintains a set of files for each suspicious file. In one embodiment, the file set tracking module creates a separate set for each file designated as suspicious. The set includes the suspicious file itself. In addition, the tracking module 315 tracks the behaviors of the files in the set and records each time a file is dropped from a file in the set. The tracking module 315 adds the dropped files to the set. For example, if a suspicious file is an installer, the installer when executed drops (e.g., extracts or downloads) files onto the endpoint 110. The tracking module 315 maintains a set of files that includes the suspicious installer as well as all files that are dropped by the suspicious installer.

The tracking module 315 also tracks the files in a set to record system changes made to the endpoint 110 by the files. System changes include, for example, registry changes, file modifications, file attribute changes, firewall setting changes, system clock changes, etc. Any system changes can be recorded so that, if necessary, the changes can be undone to restore the endpoint 110 to its prior state. In one embodiment, the tracking module only tracks and records system changes made by portable executable files in a set, such as files with .EXE or .DLL extensions. For files that are not in a set (i.e. non-suspicious files), the tracking module 315 may not track and record system changes. Because an endpoint 110 may have a large number of files, tracking only the system changes caused by suspicious file sets helps to conserve system resources.

The tracking module 315 stores the suspicious file sets and system changes in a file set database 317. The tracking module 315 updates the data within the database 317 to reflect any activity (e.g., dropping files or system changes) by the suspicious file sets. As used herein, the term "database" refers to an information store and does not imply that the data in the "database" is organized in a particular structure beyond that described herein. In one embodiment, all or some of the data in the database are stored in attributes associated with the files being monitored. For example, a file's attributes can indicate that it is a member of a particular file set and/or associated with particular suspicious file. In such an embodiment, there need not be a centralized database 317 of file sets.

A behavior monitoring module 320 monitors the behaviors of files on the endpoint 110 for suspicious behavior. The behavior of a file can be monitored, for example, by monitoring processes or software launched by or associated with the file. In one embodiment, the behavior monitoring module monitors the behaviors of files within the set associated with the suspicious file. The behavior monitoring module 320 may evaluate the behaviors of the files both individually (i.e. evaluating the behavior of each file in the set) and collectively (i.e. evaluating the collective behaviors of the files in the set).

The behavior monitoring module 320 employs one or more heuristics to determine whether the files in the set represent a malicious software application. Each heuristic describes one or more conditions that, if satisfied, indicate that a file represents malware. A heuristic is satisfied if any file in a set fulfills the conditions of the heuristic, and/or the collective actions of the files in the set fulfill the conditions of the heuristic.

In one embodiment, some of the heuristics are resource intensive heuristics that use resource intensive techniques to evaluate behaviors. Behaviors of files in the set associated with the suspicious file are evaluated against the heuristics regardless of whether the heuristics are resource intensive. For files that are not in a set of suspicious files, the behavior monitoring module 320 may not apply the resource intensive heuristics because it is not likely that these files represent malware. For example, the behavior monitoring module 320 may exempt these files from monitoring thereby obviating the need to apply any heuristics at all. Alternatively, the behavior monitoring module 320 may monitor the behavior of these files and apply a sub-set of the heuristics that is less resource-intensive. Whether a heuristic is resource intensive may be identified, for example, from information stored in the endpoint 110 or retrieved from the security server 120.

The heuristics that are utilized depend on the specific embodiment. In one embodiment, a heuristic is designed to detect a misleading application. Misleading applications are often created by persons that are not well-versed in the English language. As a result, misleading applications are replete with grammatical or spelling errors. According to this heuristic, a software application, or more specifically the file that launched the software application, is declared malicious if a message generated by the software contains grammatical/spelling errors. For example, if a message generated by a software application states "Security threet detected. Here click to problem solve", it can be readily identified that this sentence contains grammatical and spelling errors and is probably produced by a misleading application.

Another heuristic specifies that a file is malicious if it launches a process that sends more than a certain number of e-mails within a certain time period. Other heuristics specify that a file is malicious if it launches a process that searches the local computer system for e-mail addresses, performs certain network activities such as copying files, makes registry changes related to the persistency of the file, etc.

A response module 325 performs one or more actions in response to the detection of a malicious file by the behavior monitoring module. Depending on the embodiment, possible actions can include convicting the file as malicious, performing secondary tests on the file to determine whether it is truly malicious (e.g., by signature matching to known malware), providing an alert to a user of the endpoint 110, etc. Other possible actions involve remediation, which include quarantining the file, preventing the file from performing certain actions, removing the file, undoing any system changes made by the file, etc. In one embodiment, the response module applies one or more of these actions to the entire set of files associated with the malicious file, as opposed to just the malicious file itself. For example, if one file in a set is detected as malicious, the entire set can be removed and system changes made by the entire set can be undone.

Figure 4:
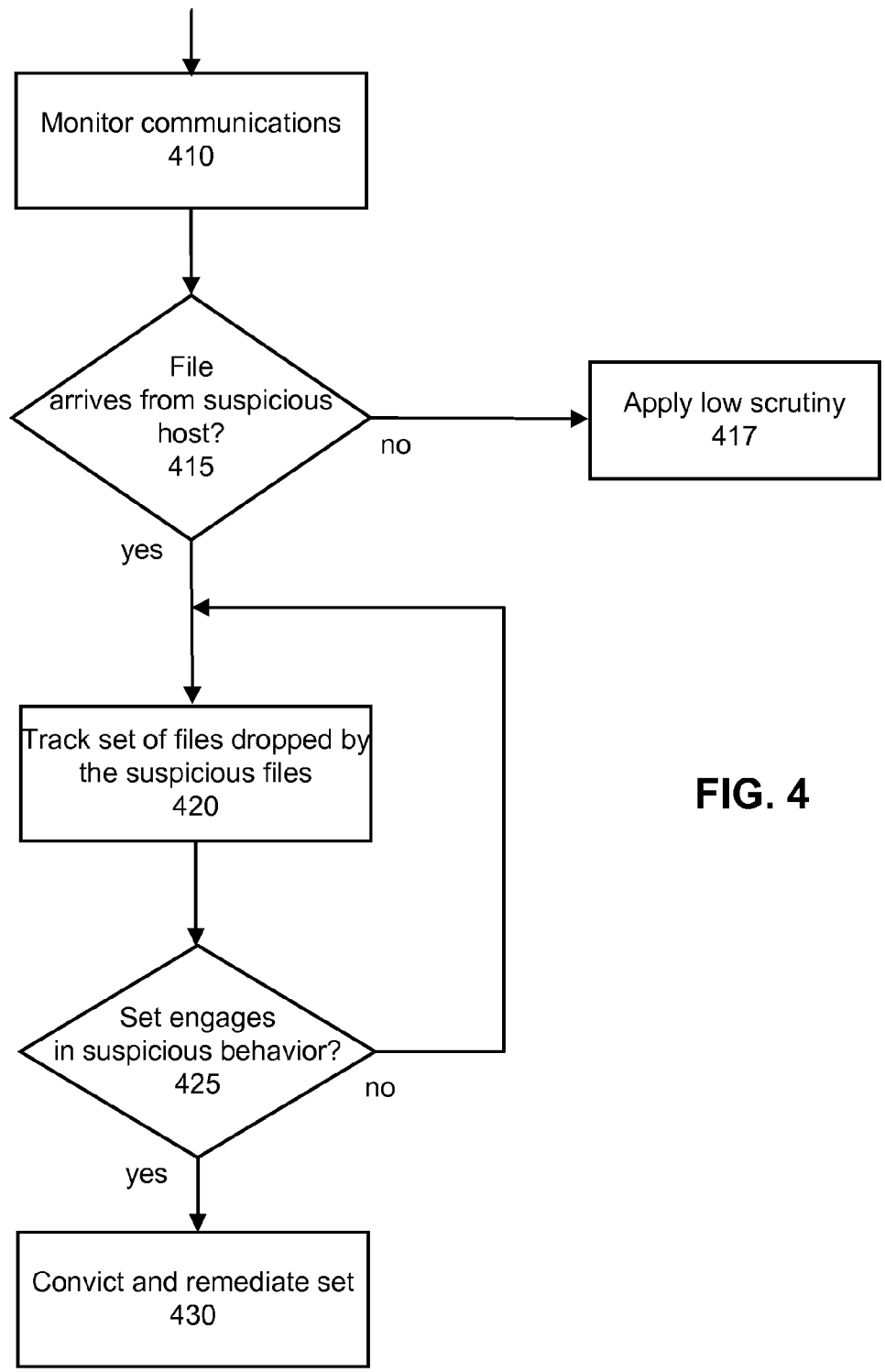
FIG. 4 is a flowchart illustrating steps performed by the security module according to one embodiment.

FIG. 4 is a flowchart 400 illustrating steps performed by the security module 111 according to one embodiment. Other embodiments perform the illustrated steps in different orders, and/or perform different or additional steps. Moreover, some or all of the steps can be performed by modules other than the security module 111. Further, one or more of the illustrated steps can be performed simultaneously by the security module 111.

The security module 111 monitors 410 communications on the endpoint 110. The security module 111 detects when a new file arrives on the endpoint 110, and it detects the host 140 that the file arrived from. If 415 the file arrived from a suspicious host 140, the security module 111 designates the file as suspicious. In one embodiment, the security module 111 determines whether a host is suspicious by querying a security server 120 and receiving an indication of whether the host 140 is suspicious. Low scrutiny is applied 417 to files that are not designated as suspicious and files dropped by those files. Low scrutiny can include exempting these files from tracking, exempting these files from monitoring, and/or monitoring the behavior of these files with a set of low resource intensive heuristics.

The security module 111 tracks 420 the suspicious file. In one embodiment, the security module 111 creates a logical set of files associated with the suspicious file. The set contains the suspicious file and any file that is dropped from the suspicious file. The security module 111 also records any system changes made by files in the set.

If 425 the files in the set, either individually or collectively engage in behavior indicating the existence of malicious software, the security module 111 in one embodiment convicts 430 the set as malicious. In other embodiments, the security module 111 remediates 430 the endpoint 110 by performing actions such as quarantining the set, blocking the set from performing certain actions, removing the set, and/or removing all system changes made by the set. If files in the set do not engage in behavior indicating the existence of malicious software, the security module 111 continues to track the set.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The invention claimed is:

1. A computer-implemented method for detecting malicious software (malware) on an endpoint, comprising:
   detecting arrival of a file at the endpoint from a host;
   observing network traffic at the endpoint to observe a network identifier of the host from which the file arrived;
   querying a security server as to whether the network identifier is associated with a suspicious host;
   receiving a response to the query from the security server, the response indicating whether the network identifier is associated with a suspicious host;
   responsive to receiving an indication that the network identifier is associated with a suspicious host, applying a first set of heuristics to the file to determine whether the file is malware; and
   responsive to receiving an indication that the network identifier is not associated with a suspicious host, applying a second set of heuristics less resource-intensive than the first set of heuristics to the file to determine whether the file is malware.

2. The method of claim 1, wherein applying the first set of heuristics to the file comprises:
   tracking changes to the endpoint made by the file; and
   storing a record of the changes to the endpoint made by the file, the record associated with the file.

3. The method of claim 1, further comprising:
   responsive to determining that the file is malware, remediating the malware.

4. The method of claim 1, wherein the arrived file comprises an installer and the installer drops files on the endpoint responsive to execution of the installer by extracting files based on data in the installer, further comprising:
   identifying a set of files on the endpoint, the set comprising the arrived file and the extracted files;
   wherein responsive to receiving an indication that the network identifier is associated with a suspicious host, the first set of heuristics is applied to the files in the set to determine whether any of the files in the set are malware; and
   wherein responsive to receiving an indication that the network identifier is not associated with a suspicious host, the second set of heuristics less resource-intensive than the first set of heuristics is applied to the files in the set to determine whether any of the files in the set are malware.

5. The method of claim 1, wherein applying the second set of heuristics less resource-intensive than the first set of heuristics comprises:
   applying a sub-set of the first set of heuristics to the file as the second set of heuristics.

6. The method of claim 1, further comprising:
   determining whether a heuristic is resource intensive responsive to information stored on the endpoint.

7. The method of claim 1, further comprising:
  determining whether a heuristic is resource intensive responsive to information retrieved from the security server.

8. A non-transitory computer-readable storage medium storing executable computer program instructions for detecting malicious software (malware) on an endpoint, the computer program instructions comprising instructions for:
  detecting arrival of a file at the endpoint from a host;
  observing network traffic at the endpoint to observe a network identifier of the host from which the file arrived;
  querying a security server as to whether the network identifier is associated with a suspicious host;
  receiving a response to the query from the security server, the response indicating whether the network identifier is associated with a suspicious host;
  responsive to receiving an indication that the network identifier is associated with a suspicious host, applying a first set of heuristics to the file to determine whether the file is malware; and
  responsive to receiving an indication that the network identifier is not associated with a suspicious host, applying a second set of heuristics less resource-intensive than the first set of heuristics to the file to determine whether the file is malware.

9. The non-transitory computer-readable storage medium of claim 8, wherein applying the first set of heuristics to the file comprises:
  tracking changes to the endpoint made by the file; and
  storing a record of the changes to the endpoint made by the file, the record associated with the file.

10. The non-transitory computer-readable storage medium of claim 8, further comprising instructions for:
  responsive to determining that the file is malware, remediating the malware.

11. The non-transitory computer-readable storage medium of claim 8, wherein the arrived file comprises an installer and the installer drops files on the endpoint responsive to execution of the installer by extracting files based on data in the installer, further comprising instructions for:
  identifying a set of files on the endpoint, the set comprising the arrived file and the extracted files;
  wherein responsive to receiving an indication that the network identifier is associated with a suspicious host, the first set of heuristics is applied to the files in the set to determine whether any of the files in the set are malware; and
  wherein responsive to receiving an indication that the network identifier is not associated with a suspicious host, the second set of heuristics less resource-intensive than the first set of heuristics is applied to the files in the set to determine whether any of the files in the set are malware.

12. The non-transitory computer-readable storage medium of claim 8, wherein applying the second set of heuristics less resource-intensive than the first set of heuristics comprises:
  applying a sub-set of the first set of heuristics to the file as the second set of heuristics.

13. The non-transitory computer-readable storage medium of claim 8, further comprising instructions for:
  determining whether a heuristic is resource intensive responsive to information stored on the endpoint.

14. The non-transitory computer-readable storage medium of claim 8, further comprising instructions for:
  determining whether a heuristic is resource intensive responsive to information retrieved from the security server.

15. A system for detecting malicious software (malware) on an endpoint, the system comprising:
  a non-transitory computer-readable storage medium storing executable computer program instructions comprising instructions for:
    detecting arrival of a file at the endpoint from a host;
    observing network traffic at the endpoint to observe a network identifier of the host from which the file arrived;
    querying a security server as to whether the network identifier is associated with a suspicious host;
    receiving a response to the query from the security server, the response indicating whether the network identifier is associated with a suspicious host;
    responsive to receiving an indication that the network identifier is associated with a suspicious host, applying a first set of heuristics to the file to determine whether the file is malware;
    responsive to receiving an indication that the network identifier is not associated with a suspicious host, applying a second set of heuristics less resource-intensive than the first set of heuristics to the file to determine whether the file is malware; and
  a processor for executing the computer program instructions.

16. The system of claim 15, wherein applying the first set of heuristics to the file comprises:
  tracking changes to the endpoint made by the file; and
  storing a record of the changes to the endpoint made by the file, the record associated with the file.

17. The system of claim 15, the non-transitory computer-readable storage medium further storing computer program instructions for:
  responsive to determining that the file is malware, remediating the malware.

18. The system of claim 15, wherein applying the second set of heuristics less resource-intensive than the first set of heuristics comprises:
  applying a sub-set of the first set of heuristics to the file as the second set of heuristics.

19. The system of claim 15, the non-transitory computer-readable storage medium further storing computer program instructions for:
  determining whether a heuristic is resource intensive responsive to information stored on the endpoint.

20. The system of claim 15, the non-transitory computer-readable storage medium further storing computer program instructions for:
  determining whether a heuristic is resource intensive responsive to information retrieved from the security server.

* * * * *